United States Patent
Jiang et al.

(10) Patent No.: US 11,751,161 B2
(45) Date of Patent: Sep. 5, 2023

(54) TERMINAL DEVICE LOCATING METHOD, TERMINAL DEVICE, SYSTEM AND SERVER

(71) Applicant: BEIJING BAIDU NETCOM SCIENCE TECHNOLOGY CO., LTD., Beijing (CN)

(72) Inventors: Fangsheng Jiang, Beijing (CN); Hailu Jia, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 185 days.

(21) Appl. No.: 17/354,209

(22) Filed: Jun. 22, 2021

(65) Prior Publication Data
US 2021/0377898 A1 Dec. 2, 2021

(30) Foreign Application Priority Data

Oct. 22, 2020 (CN) .......................... 202011138256.0

(51) Int. Cl.
| | |
|---|---|
| *H04W 64/00* | (2009.01) |
| *H04W 4/90* | (2018.01) |
| *H04L 9/30* | (2006.01) |
| *H04L 9/40* | (2022.01) |
| *H04W 4/14* | (2009.01) |

(52) U.S. Cl.
CPC ............. *H04W 64/00* (2013.01); *H04L 9/30* (2013.01); *H04L 63/0428* (2013.01); *H04W 4/14* (2013.01); *H04W 4/90* (2018.02)

(58) Field of Classification Search
CPC ......... H04W 64/00; H04W 4/90; H04W 4/14; H04L 9/30; H04L 63/0428
See application file for complete search history.

(56) References Cited

U.S. PATENT DOCUMENTS

| | | | | |
|---|---|---|---|---|
| 2003/0050039 | A1 | 3/2003 | Baba et al. | |
| 2012/0309340 | A1* | 12/2012 | Ray | H04W 76/50 455/404.1 |
| 2018/0206100 | A1* | 7/2018 | Eisner | H04W 12/02 |

FOREIGN PATENT DOCUMENTS

| | | | | |
|---|---|---|---|---|
| CN | 105430612 A | * | 3/2016 | ............. H04L 67/18 |
| CN | 105430612 B | | 9/2020 | |
| WO | WO-2008018937 A1 | * | 2/2008 | ............ H04W 4/029 |

OTHER PUBLICATIONS

Office Action from priority application No. CN 202011138256.0 dated Jun. 2, 2021.

* cited by examiner

*Primary Examiner* — Umair Ahsan (74) *Attorney, Agent, or Firm* — Harness, Dickey & Pierce, P.L.C.

(57) ABSTRACT

The present application discloses a terminal device locating method, a terminal device, a system, an emergency locating server, an electronic device and a storage medium, and relates to locating and information flow technologies. A specific implementation solution is: acquiring dialing information of a call of a terminal device, sending information related to a location of the terminal device through a non-network channel to an emergency locating server if the call is determined to be an emergency call according to the dialing information, where the information related to the location of the terminal device is used to locate the terminal device and obtain locating information of the terminal device.

18 Claims, 5 Drawing Sheets

TERMINAL DEVICE LOCATING METHOD, TERMINAL DEVICE, SYSTEM AND SERVER

CROSS-REFERENCE TO RELATED APPLICATIONS

This application claims priority to Chinese Patent Application No. 202011138256.0, filed on Oct. 22, 2020, which is hereby incorporated by reference in its entirety.

TECHNICAL FIELD

The present application relates to locating and information flow technologies in data processing, and in particular, to a terminal device locating method, a terminal device, a system, an emergency locating server, an electronic device and a storage medium.

BACKGROUND

Emergency location service (ELS) refers to a kind of location function service that a user of a terminal device (such as a handheld mobile terminal) realizes when dialing relevant emergency calls. This function strives to acquire location information of the terminal device quickly and accurately.

In prior art, the terminal device can acquire information related to a location of the terminal device by setting a software development kit (SDK) for locating, and send the information related to the location of the terminal device to an emergency locating server, and the emergency locating server sends the information related to the location of the terminal device to a platform for providing emergency assistance. The platform for providing emergency assistance can analyze the information related to the location of the terminal device, determine location information of the terminal device, and provide corresponding emergency assistance.

However, during a call process, a network of the terminal device is disconnected, which may lead to a problem that the terminal device cannot transmit the information related to the location of the terminal device to the emergency locating server.

SUMMARY

The present application provides a terminal device locating method, a terminal device, a system, an emergency locating server, an electronic device and a storage medium for improving locating efficiency.

According to a first aspect of the present application, a terminal device locating method is provided, which is applied to the terminal device, and includes:

acquiring dialing information of a call of the terminal device; and sending information related to a location of the terminal device through a non-network channel to an emergency locating server if the call is determined to be an emergency call according to the dialing information, where the information related to the location of the terminal device is used to locate the terminal device and obtain locating information of the terminal device.

In this embodiment, when the terminal device is in a call state and the call is specifically an emergency call, the terminal device can send the information related to the location of the terminal device to the emergency locating server through the non-network channel, so as to acquire the locating information of the terminal device, which achieves the technical effect of improving locating efficiency and reliability of the terminal device.

According to a second aspect of the present application, a terminal device locating method is provided, which is applied to an emergency locating server, and includes:

receiving information related to a location of a terminal device sent by the terminal device based on a non-network channel;

sending a locating request to a cloud server, where the locating request includes the information related to the location of the terminal device, and the information related to the location of the terminal device is used to locate the terminal device and obtain locating information of the terminal device; and receiving the locating information of the terminal device fed back by the cloud server, and sending the locating information to a receiver platform corresponding to dialing information.

According to a third aspect of the present application, a terminal device is provided, including:

an acquiring module, configured to acquire dialing information of a call of the terminal device; and a first sending module, configured to send information related to a location of the terminal device through a non-network channel to an emergency locating server if the call is determined to be an emergency call according to the dialing information, where the information related to the location of the terminal device is used to locate the terminal device and obtain the locating information of the terminal device.

According to a fourth aspect of the present application, an emergency locating server is provided, including:

a receiving module, configured to receive information related to a location of a terminal device sent by the terminal device based on a non-network channel; and a second sending module, configured to send a locating request to a cloud server, where the locating request includes the information related to the location of the terminal device, and the information related to the location of the terminal device is used to locate the terminal device and obtain locating information of the terminal device;

where the receiving module is configured to receive the locating information of the terminal device fed back by the cloud server; and the second sending module is configured to send the locating information to a receiver platform corresponding to dialing information.

According to a fifth aspect of the present application, a terminal device locating system is provided, including:

a terminal device according to the third aspect;

an emergency locating server according to the fourth aspect.

According to a sixth aspect of the present application, an electronic device is provided, including:

at least one processor; and a memory, in a communicational connection with the at least one processor; where, the memory stores instructions executable by the at least one processor, the instructions are executed by the at least one processor to enable the at least one processor to perform the method according to the first aspect; or to enable the at least one processor to perform the method according to the second aspect.

According to a seventh aspect of the present application, a non-transitory computer-readable storage medium storing computer instructions is provided, where the computer instructions are used to cause a computer to perform the method according to according to the first aspect; or the computer instructions are used to cause the computer to perform the method according to the second aspect.

The technical solution in the present application of acquiring dialing information of a call of a terminal device, sending information related to a location of the terminal device through a non-network channel to an emergency locating server if the call is determined to be an emergency call according to the dialing information, where the information related to the location of the terminal device is used to locate the terminal device and obtain locating information of the terminal device, solves the problem in the related art that a network of the terminal device will be automatically disconnected during a call process of the terminal device, resulting in a long network delay of the terminal device transmitting the information related to the location of the terminal device to the emergency locating server, and can avoid the problem of long network delay caused by network interruption by transmitting the information related to the location of the terminal device through the non-network channel, thereby achieving the technical effect of improving efficiency and reliability of information transmission.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The accompanying drawings are used to better understand solutions, and do not limit the present application. In the accompanying drawings.

DESCRIPTION OF EMBODIMENTS

The following describes exemplary embodiments of the present application in combination with the accompanying drawings, in which various details of the embodiments of the present application are included to facilitate understanding, and they shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following description.

Figure 1:
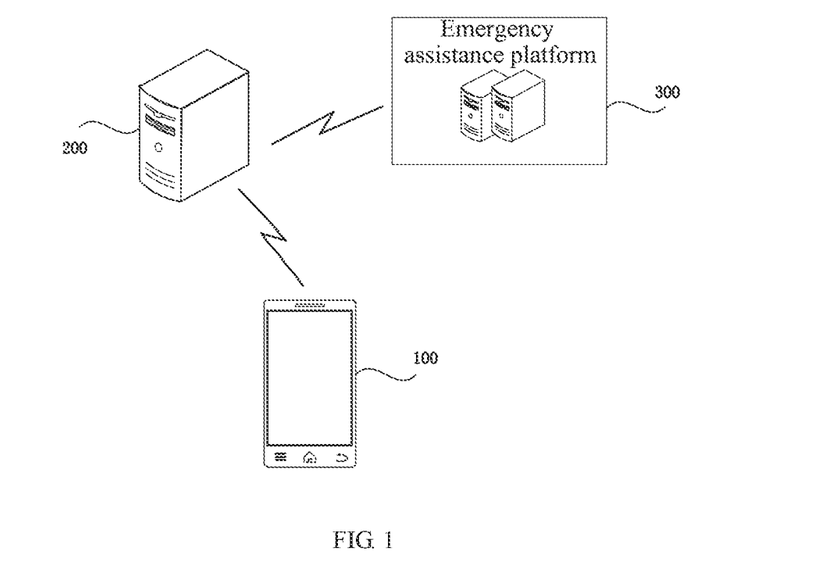
FIG. 1 is a schematic diagram according to a first embodiment of the present application.

FIG. 1 is a schematic diagram according to a first embodiment of the present application. As shown in FIG. 1, an application scenario of a terminal device locating method provided by the embodiment of the present application may include: a terminal device 100, an emergency locating server 200 and a platform for providing emergency assistance (hereinafter referred to as an assistance platform) 300.

Exemplarily, the terminal device 100 can be used to represent a device that supports making a phone call and acquiring information related to a location of a terminal device. For example, the terminal device 100 may be a mobile terminal, such as a mobile phone (or referred to as a "cellular" phone) and a computer with a mobile terminal, for example, a portable, pocket, handheld, built-in computer or vehicle-mounted mobile device; the terminal device 100 may also be a personal communication service (PCS) telephone, a cordless telephone, a session initiation protocol (SIP) telephone, a wireless local loop (WLL) station, a personal digital assistant (PDA), a tablet computer, a wireless modem, a handheld device (handset), a laptop computer, a machine type communication (MTC) terminal and other devices, which are not limited here.

The emergency locating server 200 can be used to represent a server that interacts with the terminal device 100 when a call of the terminal device 100 is an emergency call, such as 110, 119 and 120, to receive information related to a location of the terminal device provided by the terminal device 100 and send the information related to the location of the terminal device to a server of the assistance platform.

The assistance platform 300 can be used to represent a platform for providing emergency assistance according to location information of the terminal device. Exemplarily, the assistance platform can include one or more servers (as shown in FIG. 1), such as a server cluster composed of multiple servers.

For example, in combination with the application scenario as shown in FIG. 1, a calling user can make a phone call based on the terminal device 100. If a dialed phone number is 110, then accordingly, the called 110 will answer the phone call, and the terminal device 100 will send information related to a location of the terminal device to the emergency locating server 200, then the emergency locating server 200 sends the information related to the location of the terminal device to the assistance platform 300. The assistance platform 300 can analyze the information related to the location of the terminal device and determine locating information of the terminal device 100, or, the assistance platform 300 can send the information related to the location of the terminal device to a third party platform with a locating service function (not shown in the figure). The third party analyzes the information related to the location of the terminal device, and sends a locating information method obtained from the analysis to the assistance platform 300, so that the assistance platform 300 can carry out emergency assistance.

Figure 2:
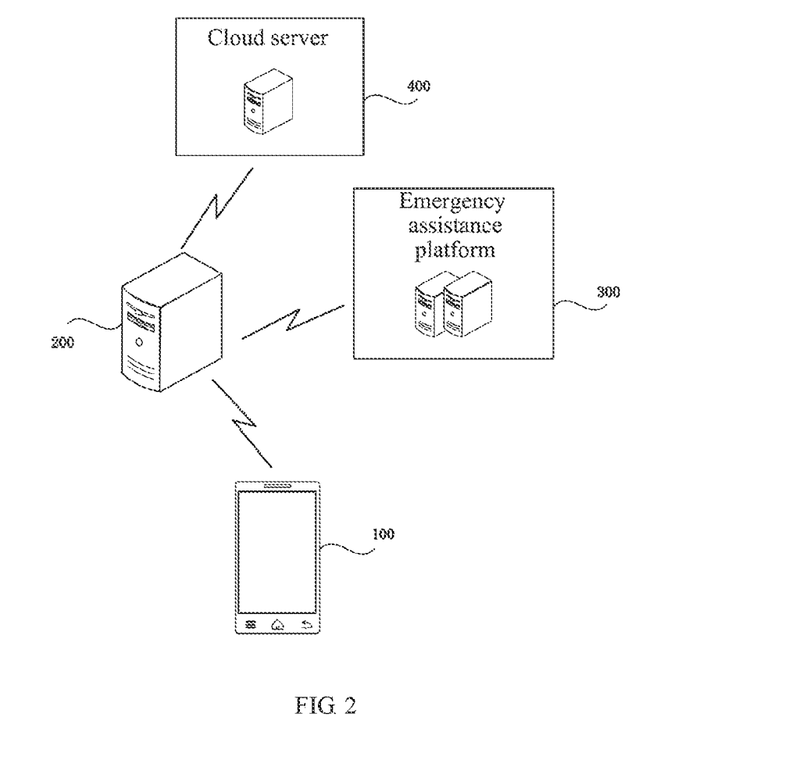
FIG. 2 is a schematic diagram according to a second embodiment of the present application.

FIG. 2 is a schematic diagram according to a second embodiment of the present application. As shown in FIG. 2, the embodiment adds a cloud server 400 on the basis of the application scenario shown in FIG. 1. For example, the cloud server 400 is communicatively connected with an emergency locating server 200, and the cloud server 400 can be used to provide location services.

For example, a calling user can make a phone call based on a terminal device 100. If a dialed phone number is 110, accordingly, the called 110 will answer the phone call, and the terminal device 100 will send information related to a location of the terminal device to the emergency locating server 200, then the emergency locating server 200 sends the information related to the location of the terminal device to the cloud server 400. The cloud server 400 determines locating information of the terminal device 100 according to the information related to the location of the terminal device, and feed back the locating information to the emergency locating server 200. The emergency locating server 200 sends the locating information to an assistance platform 300, so that the assistance platform 300 can implement emergency assistance based on the locating information.

It should be understood that the above examples are only used to demonstrate the application scenarios that the terminal device locating method of the embodiment may be applicable, and cannot be understood as a limitation of the application scenarios of the terminal device locating method of the embodiment.

It is worth noting that during a call process of a terminal device, network of the terminal device will be automatically disconnected, resulting in a network delay when the terminal device transmits the information related to the location of the terminal device to an emergency locating server, which leads to disadvantages of long locating time and low efficiency.

Through creative work, the inventor of the present application has obtained an inventive conception of the present application: a terminal device sends information related to a location of the terminal device to an emergency locating server through a non-network channel, which can avoid disadvantages of long locating time caused by an unavailability of a network channel, so as to achieve the technical effect of improving the locating reliability.

The technical solutions of the present application and how the technical solutions of the present application solve the above technical problems are described in detail with specific embodiments. The following specific embodiments can be combined with each other, and the same or similar concepts or processes may not be repeated in some embodiments. The following will describe embodiments of the present application in combination with the accompanying drawings.

The present application provides a terminal device locating method, which is applied to locating and information flow technologies, so as to achieve the technical effect of improving the locating efficiency and reliability.

Figure 3:
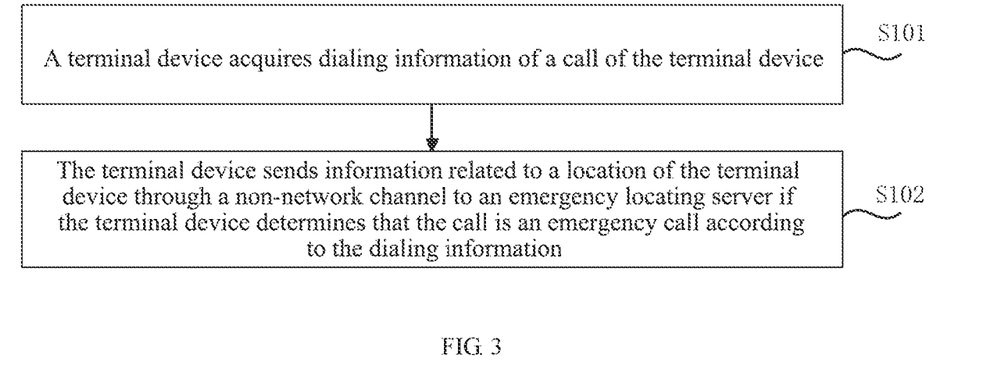
FIG. 3 is a schematic diagram according to a third embodiment of the present application.

FIG. 3 is a schematic diagram according to a third embodiment of the present application. As shown in FIG. 3, a terminal device locating method provided by the embodiment includes:

S101: a terminal device acquires dialing information of a call of the terminal device.

Exemplarily, an executive entity of this embodiment can be a terminal device, and a processor or chip set on the terminal device, etc., which is not limited in this embodiment.

When the method of the embodiment is applied to the application scenario as shown in FIG. 1 or FIG. 2, the executive entity can be the terminal device as shown in FIG. 1 or FIG. 2, and the description of the terminal device can refer to the above example, which will not be repeated here. In the embodiment, an exemplary description will be made with the executive entity as a terminal device as an example.

Exemplarily, the dialing information may be used to represent information of a dialed telephone number. In some embodiments, the terminal device can acquire the dialing information by monitoring.

For example, in combination with the application scenario as shown in FIG. 1, when a user performs a dialing operation through the terminal device, the terminal device can acquire the dialing information corresponding to the user's dialing operation.

S102: the terminal device sends information related to a location of the terminal device through a non-network channel to an emergency locating server if the terminal device determines that the call is an emergency call according to the dialing information, where the information related to the location of the terminal device is used to locate the terminal device and obtain locating information of the terminal device.

Exemplarily, this step can specifically include that: the terminal device determines whether the call is an emergency call according to the dialing information; if so, it sends the information related to the location of the terminal device to the emergency locating server through the non-network channel; if not, the process ends. Moreover, the emergency call can be understood as a call generated by the user dialing an emergency phone call (such as 110, 120, etc.).

It is worth noting that during a call process of the terminal device, network of the terminal device will be automatically disconnected, resulting in a disadvantage of a long network delay when the terminal device transmits the information related to the location of the terminal device to an emergency locating server. While in this embodiment, the information related to the location of the terminal device is transmitted through a non-network channel, which can avoid the problem of long network delay caused by network interruption, thereby achieving the technical effect of improving transmission efficiency and reliability of information related to the location of the terminal device.

Figure 4:
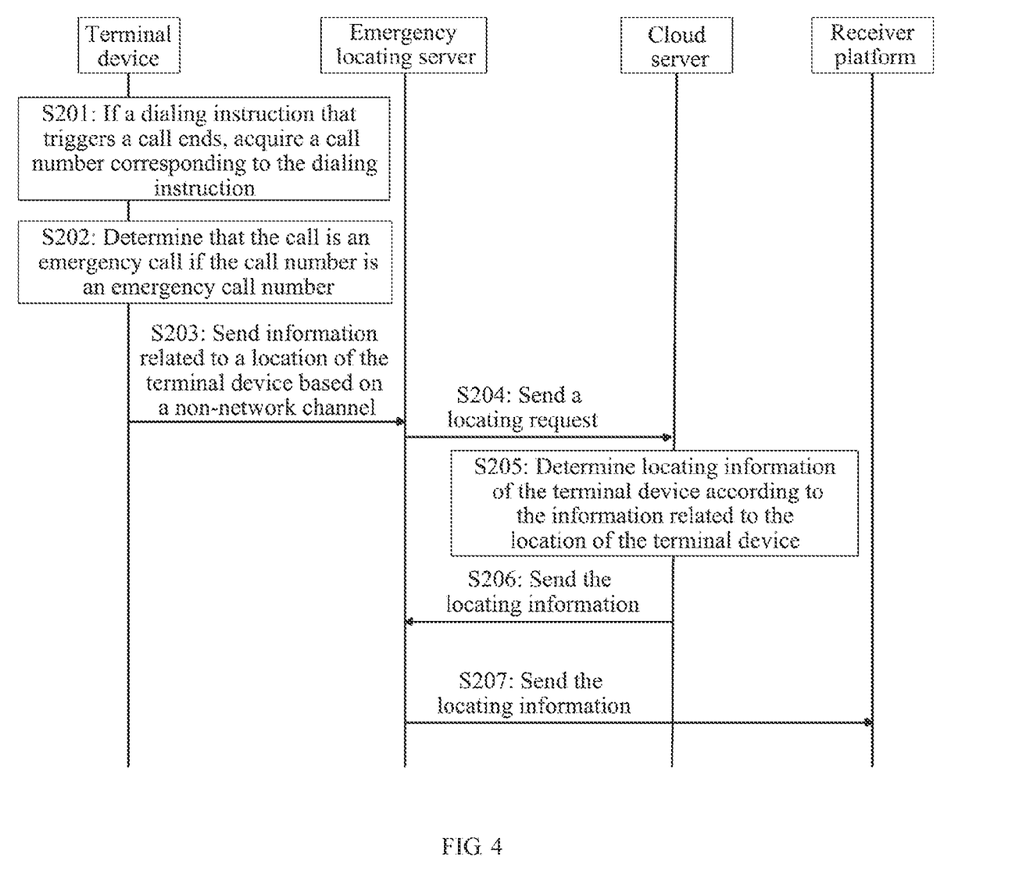
FIG. 4 is a schematic diagram according to a fourth embodiment of the present application.

FIG. 4 is a schematic diagram according to a fourth embodiment of the present application. As shown in FIG. 4, a terminal device locating method provided by the embodiment includes:

S201: if a dialing instruction that triggers a call ends, a terminal device acquires a call number corresponding to the dialing instruction.

Exemplarily, in combination with the application scenario shown in FIG. 2, a user can dial to the terminal device by voice or touch. For example, if the terminal device is equipped with a virtual key or an entity key, the user dials by touch through the entity key or the virtual key, and the terminal device generates a dialing instruction based on the user's touch operation, and dial a number determined by the user based on touch.

The terminal device can monitor the dialing instruction to determine whether the dialing instruction ends. If the terminal device determines that the dialing instruction ends, that is, the user has finished dialing, then the terminal device will acquire the call number corresponding to the dialing instruction when it sends a call request for calling a called to a telephone operation system.

It is worth noting that, in some embodiments, S201 can be replaced by: if the dialing instruction that triggers the call ends and the terminal device is in a call state, acquire the call number corresponding to dialing instruction.

In combination with the above example, if the user dialing ends and the call request initiated by the terminal device is answered (that is, the terminal device is in the call state), the terminal device acquires the call number dialed by the user.

That is to say, in the present application, the terminal device can acquire the call number when the user's dialing ends and the called has not answered the phone, or the terminal device can acquire the call number when the user's dialing ends and the called has answered the phone (i.e. in the call state), so as to achieve technical effects of diversity and flexibility of acquiring the call number.

S202: the terminal device determines that the call is an emergency call if the call number is an emergency call number.

Exemplarily, the terminal device judges the call number to determine whether the call number is an emergency call number. If the call number is determined to be an emergency call number, the current call can be regarded as the emergency call.

S203: the terminal device sends information related to a location of the terminal device to an emergency locating server based on a non-network channel.

In some embodiments, the non-network channel includes a short message channel, S203 may include the following steps:

Step 1: the terminal device encodes, based on a short message protocol, the information related to the location of the terminal device to obtain a short message.

It is worth noting that information transmitted by different channels is different, and applicable protocols may be different. In this embodiment, the terminal device can encode the information related to the location of the terminal device based on the short message protocol to obtain the short message that can be transmitted through the short message channel.

Step 2: the terminal device sends the short message to the emergency locating server through the short message channel.

In combination with the above analysis, the terminal device generates the short message based on the short message protocol, where the short message can be transmitted through the short message channel, so that the terminal device can send the short message to the emergency locating server in a timely and reliable manner, avoiding disadvantages that the information related to the location of terminal device cannot be sent to the emergency locating system in time caused by the network channel of the terminal device being in an interruption state during a call process in related art, which achieves the technical effect of improving the efficiency and reliability of information transmission.

In some other embodiments, the non-network channel includes an audio channel, S203 may include the following steps:

Step 1: convert, based on an audio protocol, the information related to the location of the terminal device into an audio message.

Similarly, information transmitted by different channels is different, and applicable protocols may be different. In this embodiment, the terminal device can encode the information related to the location of the terminal device based on the audio protocol to obtain the audio message that can be transmitted through the audio channel.

Step 2: send the audio message to the emergency locating server through the audio channel.

Similarly, in combination with the above analysis, the terminal device generates the audio message based on the audio protocol, where the audio message can be transmitted through the audio channel, so that the terminal device can send the audio message to the emergency locating server in a timely and reliable manner, avoiding disadvantages that the information related to the location of terminal device cannot be sent to the emergency locating system in time caused by the network channel of the terminal device being in an interruption state during a call process in related art, which achieves the technical effect of improving the efficiency and reliability of information transmission.

It is worth noting that in some other embodiments, the non-network channel can include both the short message channel and the audio channel, so that the terminal device can encode, based on the short message protocol, the information related to the location of the terminal device, generate the short message that can be transmitted based on the short message channel, and convert, based on the audio protocol, the information related to the location of the terminal device to the audio message that can be transmitted through the audio channel. In this way, the terminal device can send the short message to the emergency locating server based on the short message channel, and send the audio message to the emergency locating server based on the audio channel, thereby further achieving the technical effect of diversity, flexibility and reliability of information transmission.

In some embodiments, the information related to the location of the terminal device includes an identification of a base station accessed by the terminal device.

Exemplarily, if the terminal device is in a power on state, the terminal device can access to a corresponding base station, establish a communication link with the base station, and acquire and store an identification of the base station based on the communication link.

For example, the terminal device may include a list used to store base stations accessed by the terminal device. With a movement of the terminal device, the base station accessed by the terminal device may be different. Therefore, the list storing the base stations accessed by the terminal device may include relevant information of base stations accessed by the terminal device within a preset period of time, where the relevant information of the base stations include information such as identification of the base stations. In this embodiment, if the terminal device is in the call state and in a state of emergency call, the terminal device can acquire the identification of the base station from list information of the base stations to execute S203 (that is, the terminal device sends the identification of the base station to the emergency locating server).

It is worth noting that in this embodiment, by determining the identification of the base station as the information related to the location of the terminal device, so as to determine the locating information of the terminal device through the identification of the base station, the determined locating information can be highly associated with the location of the terminal device, thereby achieving the technical effect of locating accuracy and reliability.

In some embodiments, if the number of base stations accessed by the terminal device included in the list information of the base stations is plural, and time information of each base station is included in the list information of the base station, the terminal device can select a base station corresponding to time information closest to a current time from the base stations, and send the identification of the base station to the emergency locating server.

It is worth noting that by determining the identification of the base station corresponding to the time information closest to the current time as the information related to the location of the terminal device, timeliness of the identification of the base station can be improved, that is, timeliness and reliability of the information related to the location of the terminal device can be improved, thereby further achieving the technical effect of the accuracy and reliability of the locating information determined based on the identification of the base station.

In combination with the above analysis, it can be seen that the information related to the location of the terminal device can include the identification of the base station. In some other embodiments, the information related to the location of the terminal device can also include a Media Access Control (MAC) address of a wireless access network device that supports an access of the terminal device.

Exemplarily, if wireless access network (Wireless Fidelity, WiFi) function of the terminal device is on, the terminal device can search for a wireless access network device that can be accessed by the terminal device, and obtain a list information of wireless access network devices that support an access of the terminal device, where the list information includes MAC addresses of the wireless access network devices.

In this embodiment, if the terminal device is in the call state and in the state of emergency call, the terminal device can obtain the MAC address from the list information of the wireless access network devices to execute S203 (that is, the terminal device sends the MAC address to the emergency locating server).

It is worth noting that in this embodiment, by determining the MAC address as the information related to the location of the terminal device, so as to determine the locating information of the terminal device through the MAC address, the determined locating information can be highly associated with the location of the terminal device, thereby achieving the technical effect of locating accuracy and reliability.

In some embodiments, if the number of wireless access network devices included in the list information of wireless access network devices is plural, and wireless signal strength information of each wireless access network device is included in the list information of wireless access network devices, the terminal device can select a wireless access network device with a strongest wireless signal from the wireless access network devices, and send the MAC address of the wireless access network device to the emergency locating server.

It is worth noting that by determining the MAC address of the wireless access network device with the strongest wireless signal as the information related to the location of the terminal device, the wireless access network device can be a closest device to the terminal device, so as to improve the reliability and accuracy of the information related to the location of the terminal device, thereby further achieving the technical effect of the accuracy and reliability of the location information determined based on the MAC address.

It is worth noting that the terminal device can determine the identification of the base station as the information related to the location of the terminal device, or determine the MAC address as the information related to the location of the terminal device, or determine the identification of the base station and MAC address as the information related to the location of the terminal device, so as to realize the flexibility and diversity of the information related to the location of the terminal device, and can realize the technical effect of the reliability and accuracy of the locating information of the terminal device subsequently determined based on the information related to the location of the terminal device.

In some embodiments, the terminal device can encrypt the information related to the location of the terminal device, and send encrypted information related to the location of the terminal device to the emergency locating server.

Exemplarily, the emergency locating server can assign an encryption public key to the terminal device, the terminal device determines an encryption private key based on the encryption public key and the identification of the terminal device, encrypts the information related to the location of the terminal device through the encryption private key, and sends encrypted information related to the location of the terminal device through the non-network channel to the emergency locating server.

It is worth noting that in this embodiment, by encrypting the information related to the location of the terminal device, on the one hand, information leakage can be avoided and the technical effect of improving information security and reliability can be achieved; and on the other hand, the encryption private key is generated based on the encryption public key and the identification of the terminal device, which can achieve the technical effect of improving encryption security and reliability.

In some embodiments, the terminal device can compress the information related to the location of the terminal device, and send compressed information related to the location of the terminal device to the emergency locating server, and this embodiment does not limit a compression method.

It is worth noting that by compressing the information related to the location of the terminal device, resources for transmitting the information related to the location of the terminal device can be reduced and transmission efficiency can be improved.

It should be understood that the terminal device can decrypt the information related to the location of the terminal device, and can also compress the information related to the location of the terminal device, and can also encrypt the information related to the location of the terminal device first, and then compress the encrypted information related to the location of the terminal device, and can also compress the information related to the location of the terminal device first, and then encrypt the compressed information related to the location of the terminal device, which is not limited in this embodiment.

S204: the emergency locating server sends a locating request to a cloud server, where the locating request includes the information related to the location of the terminal device.

In some embodiments, if the information related to the location of the terminal device is the encrypted information, the emergency locating server can decrypt the encrypted information related to the location of the terminal device when receiving the encrypted information related to the location of the terminal device sent by the terminal device, and send decrypted information related to the location of the terminal device to the cloud server.

Exemplarily, the emergency locating server determines the identification of the terminal device, decrypts the information related to the location of the terminal device according to the encryption public key and the identification of the terminal device, and sends the decrypted information related to the location of the terminal device to the cloud server.

In some embodiments, if the information related to the location of the terminal device is the compressed information, the emergency locating server can decompress the compressed information related to the location of the terminal device when receiving the compressed information related to the location of the terminal device, and send decompressed information related to the location of the terminal device to the cloud server.

S205: the cloud server determines locating information of the terminal device according to the information related to the location of the terminal device.

In some embodiments, the locating information includes longitude and latitude information of the terminal device, and S205 may include that: the cloud server determines longitude and latitude of the terminal device according to the information related to the location of the terminal device.

In an implementable technical solution, if the information related to the location of the terminal device includes the identification of the base station, S205 may include that: the cloud server determines location information of the base station according to the identification of the base station, such as longitude and latitude information of the base station, and determines the locating information according to the longitude and latitude information of the base station, such as determining the longitude and latitude information of the base station as the longitude and latitude information of the terminal device, or, determining the locating information based on the longitude and latitude information of the base station and signal coverage of the base station.

In another implementable technical solution, if the information related to the location of the terminal device includes the MAC address, S205 may include that: the cloud server determines location information of the wireless access network device according to the MAC address, such as longitude and latitude information of the wireless access network device, and determines the locating information according to the longitude and latitude information of the wireless access network device, such as determining the longitude and latitude information of the wireless access network device as the longitude and latitude information of the terminal device, or, determining the locating information based on the longitude and latitude information of the wireless access network device and signal coverage of the wireless access network device.

In another implementable technical solution, if the information related to the location of the terminal device includes the identification and the MAC address of the base station, S205 may include that: the cloud server determines the location information of the base station according to the identification of the base station, such as the longitude and latitude information of the base station, and determines the location information of the wireless access network device according to the MAC address, such as the longitude and latitude information of the wireless access network device, and determines longitude and latitude information included in an intersection of the longitude and latitude information of the base station and the longitude and latitude information of the wireless access network device as the locating information.

S206: the cloud server sends the locating information to the emergency locating server.

S207: the emergency locating server sends the location information to a receiver platform corresponding to dialing information.

Exemplarily, if the dialing information is dialing information for 120, the receiver platform can be a platform of 120. Accordingly, the emergency locating server sends the location information to the platform of 120, and the platform of 120 can carry out corresponding emergency assistance based on the locating information, such as sending emergency vehicles and medical personnel based on the locating information.

Figure 5:
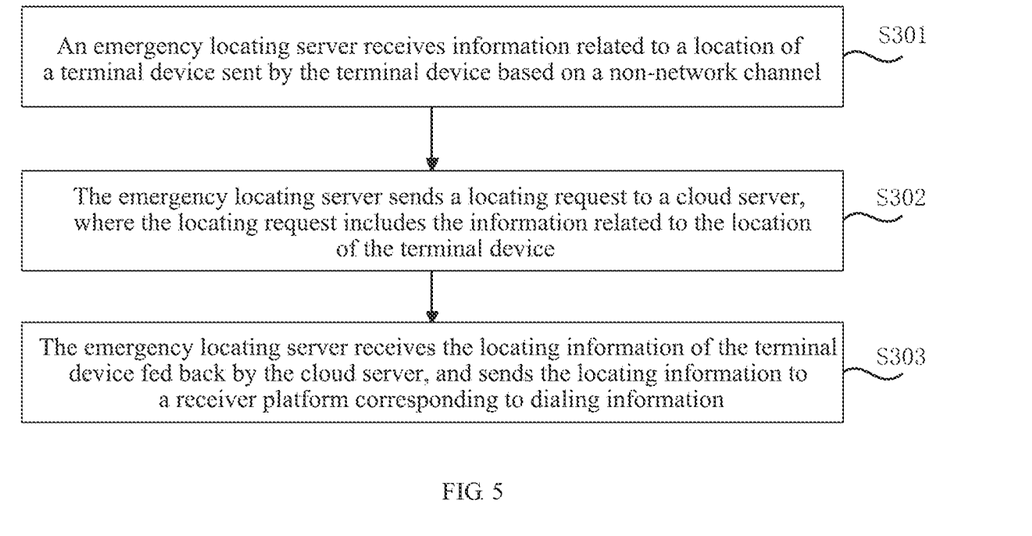
FIG. 5 is a schematic diagram according to a fifth embodiment of the present application.

FIG. 5 is a schematic diagram according to a fifth embodiment of the present application. As shown in FIG. 5, a terminal device locating method provided by the embodiment includes:

S301: an emergency locating server receives information related to a location of a terminal device sent by the terminal device based on a non-network channel;

S302: the emergency locating server sends a locating request to a cloud server, where the locating request includes the information related to the location of the terminal device, and the information related to the location of the terminal device is used to locate the terminal device and obtain locating information of the terminal device; and S303: the emergency locating server receives the locating information of the terminal device fed back by the cloud server, and sends the locating information to a receiver platform corresponding to the dialing information.

In some embodiments, the non-network channel includes a short message channel, and the information related to the location of the terminal device is a short message obtained by encoding the information related to the location of the terminal device based on a short message protocol.

In some embodiments, the non-network channel includes an audio channel, and the information related to the location of the terminal device is an audio message obtained by converting the information related to the location of the terminal device based on an audio protocol.

In some embodiments, the information related to the location of the terminal device includes an identification of a base station accessed by the terminal device, and the identification of the base station is acquired from a pre-stored list information of base stations accessed by the terminal device.

In some embodiments, the information related to the location of the terminal device includes a MAC address of a wireless access network device accessed by the terminal device, and the MAC address is acquired from a pre-stored list information of wireless access network devices that supports an access of the terminal device.

In some embodiments, before the receiving information related to a location of a terminal device sent by the terminal device based on a non-network channel, the method further includes:

assigning and sending an encryption public key to the terminal device, where the encryption public key is used to determine an encryption private key with an identification of the terminal device;

if the information related to the location of the terminal device is encrypted information, then before the sending the locating request to the cloud server, the method further includes:

determining the identification of the terminal device, and decrypting, according to the encryption public key and the identification of the terminal device, the information related to the location of the terminal device.

Figure 6:
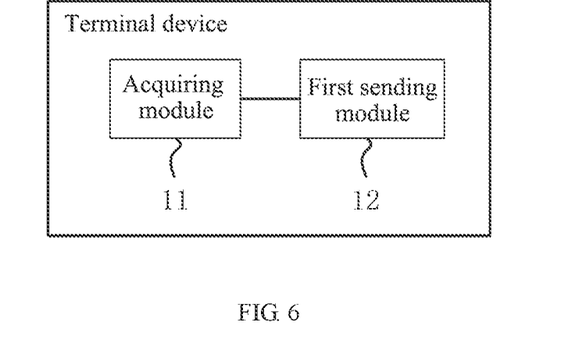
FIG. 6 is a schematic diagram according to a sixth embodiment of the present application.

FIG. 6 is a schematic diagram according to a sixth embodiment of the application. As shown in FIG. 6, a terminal device provided in the embodiment includes:

an acquiring module 11, configured to acquire dialing information of a call of the terminal device; and a first sending module 12, configured to send information related to a location of the terminal device through a non-network channel to an emergency locating server if the call is determined to be an emergency call according to the dialing information, where the information related to the location of the terminal device is used to locate the terminal device and obtain locating information of the terminal device.

In some embodiments, the non-network channel includes a short message channel; the first sending module 12 is configured to encode, based on a short message protocol, the information related to the location of the terminal device to obtain a short message, and send the short message to the emergency locating server through the short message channel.

In some embodiments, the non-network channel includes an audio channel; the first sending module 12 is configured to convert, based on an audio protocol, the information related to the location of the terminal device into an audio message, and send the audio message to the emergency locating server through the audio channel.

Figure 7:
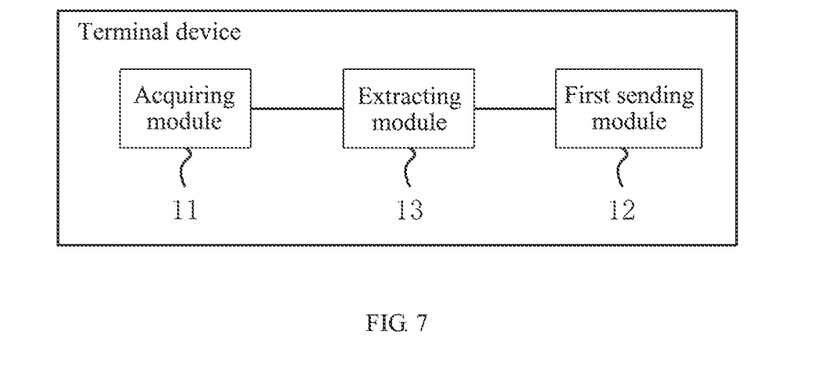
FIG. 7 is a schematic diagram according to a seventh embodiment of the present application.

FIG. 7 is a schematic diagram according to a seventh embodiment of the present application. As shown in FIG. 7, on the basis of the sixth embodiment, the information related to the location of the terminal device includes an identification of a base station accessed by the terminal device; the terminal device provided by the embodiment further includes:

an extracting module 13, configured to acquire the identification of the base station from a pre-stored list information of base stations accessed by the terminal device.

In some embodiments, the information related to the location of the terminal device includes a MAC address of a wireless access network device accessed by the terminal device; the extracting module 13 is configured to acquire the MAC address of the wireless access network device from a pre-stored list information of wireless access network devices that supports an access of the terminal device.

Figure 8:
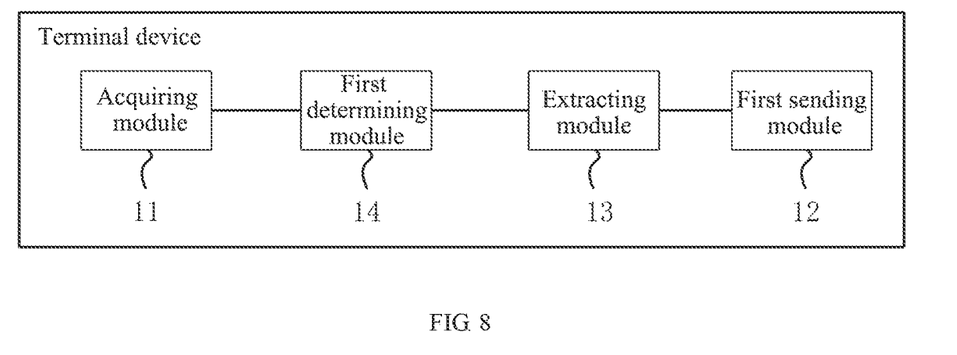
FIG. 8 is a schematic diagram according to an eighth embodiment of the present application.

FIG. 8 is a schematic diagram according to an eighth embodiment of the present application. As shown in FIG. 8, on the basis of the sixth and/or seventh embodiment, the embodiment further includes:

the dialing information includes a call number; the acquiring module 11 is configured to, if a dialing instruction that triggers the call ends, acquire a call number corresponding to the dialing instruction; or, if the dialing instruction that triggers the call ends and the terminal device is in a call state, acquire the call number corresponding to the dialing instruction; and the terminal device further includes: a first determining module 14, configured to determine that the call is an emergency call if the call number is an emergency call number.

In some embodiments, the first sending module 12 is configured to receive an encryption public key sent by the emergency locating server, determine, according to the encryption public key and an identification of the terminal device, an encryption private key, and encrypt, according to the encryption private key, the information related to the location of the terminal device, and send encrypted information related to the location of the terminal device through the non-network channel to the emergency locating server.

Figure 9:
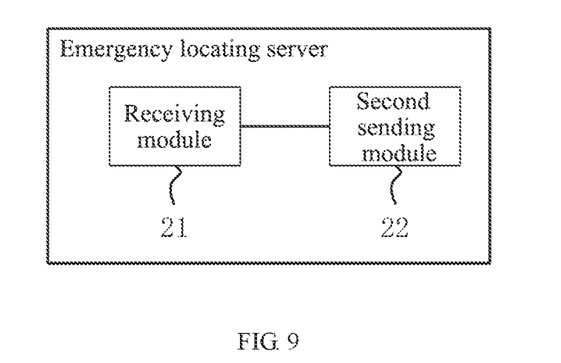
FIG. 9 is a schematic diagram according to a ninth embodiment of the present application.

FIG. 9 is a schematic diagram of a ninth embodiment of the present application. As shown in FIG. 9, an emergency locating server provided by the embodiment includes:

a receiving module 21, configured to receive information related to a location of a terminal device sent by the terminal device based on a non-network channel; and a second sending module 22, configured to send a locating request to a cloud server, where the locating request includes the information related to the location of the terminal device, and the information related to the location of the terminal device is used to locate the terminal device and obtain locating information of the terminal device;

where the receiving module 21 is configured to receive the locating information of the terminal device fed back by the cloud server; and and the second sending module 22 is configured to send the locating information to a receiver platform corresponding to dialing information.

In some embodiments, the non-network channel includes a short message channel, and the information related to the location of the terminal device is a short message obtained by encoding the information related to the location of the terminal device based on a short message protocol.

In some embodiments, the non-network channel includes an audio channel, and the information related to the location of the terminal device is an audio message obtained by converting the information related to the location of the terminal device based on an audio protocol.

In some embodiments, the information related to the location of the terminal device includes an identification of a base station accessed by the terminal device, and the identification of the base station is acquired from a pre-stored list information of base stations accessed by the terminal device.

In some embodiments, the information related to the location of the terminal device includes a MAC address of a wireless access network device accessed by the terminal device, and the MAC address is acquired from a pre-stored list information of wireless access network devices that supports an access of the terminal device.

Figure 10:
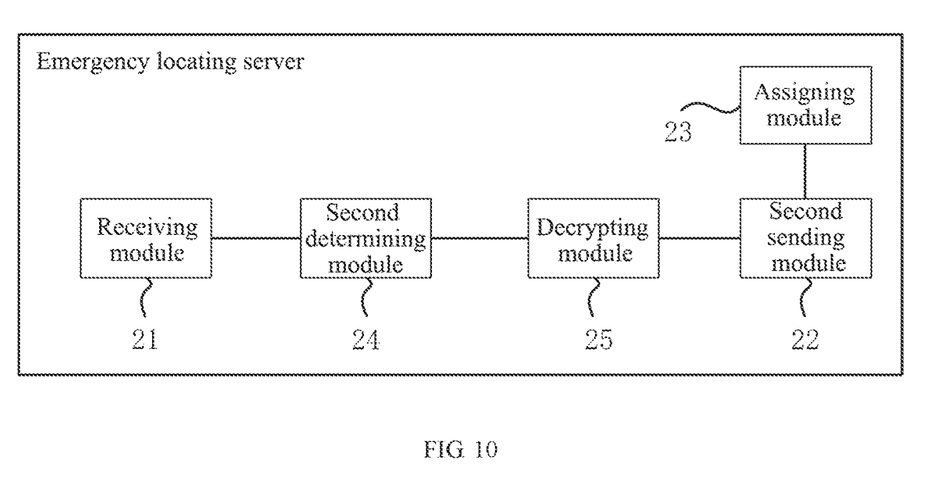
FIG. 10 is a schematic diagram according to a tenth embodiment of the present application.

FIG. 10 is a schematic diagram according to a tenth embodiment of the present application. As shown in FIG. 10, on the basis of the ninth embodiment, the emergency locating server provided by the embodiment further includes:

an assigning module 23, configured to assign and send an encryption public key to the terminal device, where the encryption public key is used to determine an encryption private key with an identification of the terminal device;

a second determining module 24, configured to determine the identification of the terminal device; and a decrypting module 25, configured to decrypt, according to the encryption public key and the identification of the terminal device, the information related to the location of the terminal device.

According to another aspect of the embodiments of the present application, an embodiment of the present application further provides a terminal device locating system, including:

a terminal device according to any one of the above embodiments, such as the terminal device according to any one of the sixth embodiment, the seventh embodiment and the eighth embodiment; and an emergency locating server according to any one of the above embodiments, such as the emergency locating server according to the ninth embodiment or the tenth embodiment.

In some embodiments, the system further includes:

a cloud server, configured to receive information related to a location of the terminal device sent by the emergency locating server, generate locating information of the terminal device according to the information related to the location of the terminal device, and send the locating information to the emergency locating server.

According to an embodiment of the present application, the present application also provides an electronic device and a readable storage medium.

Figure 11:
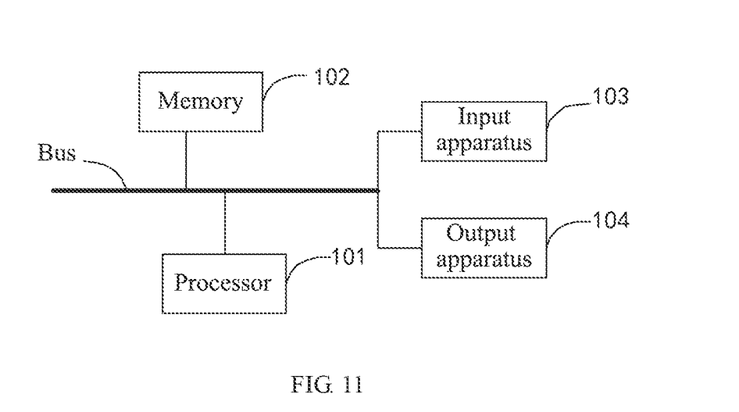
FIG. 11 is a schematic diagram according to an eleventh embodiment of the present application.

FIG. 11 is a block diagram of an electronic device for a terminal device locating method according to an embodiment of the present application.

The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 11, the electronic device includes: one or more processors 101, a memory 102, and interfaces for connecting various components, including a high-speed interface and a low-speed interface. The various components are interconnected through different buses and can be installed on a common motherboard or be installed in other ways as required. The processor may process instructions executed within the electronic device, where the instructions include instructions stored in or on the memory to display graphical information of Graphical User Interface (GUI) on an external input/output apparatus (such as, a display device coupled to an interface). In other implementations, a plurality of processors and/or a plurality of buses may be used with a plurality of memories, if required. Similarly, a plurality of electronic devices can be connected, each of which provides some of necessary operations (e.g., serving as a server array, a set of blade servers, or a multiprocessor system). In FIG. 11, one processor 101 is taken as an example.

The memory 102 is a non-transitory computer-readable storage medium according to the present application. The memory stores instructions executable by at least one processor to cause the at least one processor to perform the terminal device locating method according to the present application, such as the methods described in any one of the sixth embodiment to the tenth embodiment. The non-transitory computer-readable storage medium of the present application stores computer instructions, where computer instructions are used to cause a computer to perform the terminal device locating method in the above method embodiments, such as the methods described in any one of the sixth embodiment to the tenth embodiment.

The memory 102, as a non-transitory computer-readable storage medium, can be used to store a non-transitory software program, a non-transitory computer-executable program and a module, such as the program instruction/module corresponding to the terminal device locating method in the embodiments of the present application. By running the non-transitory software program, instructions and modules stored in the memory 102, the processor 101 performs various functional applications and data processing of a computer, that is, realizes the terminal device locating method in the above method embodiments, such as the methods described in any one of the sixth embodiment to the tenth embodiment.

The memory 102 may include a program storing area and a data storing area, where the program storing area may store an operating system and an application program required by at least one function; and the data storing area may store data created according to the use of the electronic device for performing the location detection method, and so on. In addition, the memory 102 may include a high-speed random-access memory, and may also include a non-transitory memory, for example, at least one magnetic disk storage device, a flash memory device, or other non-transitory solid-state memory devices. In some embodiments, the memory 102 may optionally include memories provided remotely with respect to the processor 101, and these remote memories may be connected to the electronic device for the terminal device locating method via a network. Examples of the above-mentioned network may include, but are not limited to, the Internet, an intranet, a local area network, a mobile communication network and a combination thereof.

The electronic device for the terminal device locating method may further include: an input apparatus 103 and an output apparatus 104. The processor 101, the memory 102, the input apparatus 103 and the output apparatus 104 may be connected via a bus or other means, and an example of a connection via the bus is shown in FIG. 11.

The input apparatus 103 may receive inputted digital or character information, and generate key signal inputs related to a user setting and functional control of the electronic device for the terminal device locating method, for example, is a touch screen, a keypad, a mouse, a trackpad, a touchpad, a pointer, one or more mouse buttons, a trackball, a joystick and other input apparatuses. The output apparatus 104 may include: a display device, an auxiliary lighting apparatus (e.g., an LED), a tactile feedback apparatus (e.g., a vibration motor) and the like. The display device may include, but is not limited to, a liquid crystal display (LCD), a light emitting diode (LED) display and a plasma display. In some implementations, the display device may be a touch screen.

Various embodiments of the systems and technologies described herein may be implemented in a digital electronic circuit system, an integrated circuit system, a specialized ASIC (application specific integrated circuit), computer hardware, firmware, software, and/or a combination thereof. These various embodiments may include: being implemented in one or more computer programs, where the one or more computer programs may be executed and/or interpreted on a programmable system including at least one programmable processor, where the programmable processor may be a specialized or general-purpose programmable processor, which may receive data and instructions from a storage system, at least one input apparatus and at least one output apparatus and send data and instructions to the storage system, the at least one input apparatus and the at least one output apparatus.

These computer programs (also referred to as programs, software, software applications, or codes) include machine instructions of a programmable processor and can be implemented by using a high-level procedure and/or object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, which includes a machine-readable medium that receives a machine instruction as a machine-readable signal. The term "machine-readable signal" refers to any signal used to provide a machine instruction and/or data to the programmable processor.

In order to provide interaction with a user, the systems and technologies described herein may be implemented on a computer, where the computer has: a display apparatus for displaying information to the user (e.g., a CRT (cathode ray tube) or LCD (liquid crystal display) monitor); and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (e.g., visual feedback, auditory feedback, or tactile feedback); and the input from the user may be received in any form (including acoustic input, voice input, tactile input).

The systems and technologies described herein may be implemented in a computing system including a back-end component (e.g., as a data server), or in a computing system including a middleware component (e.g., an application server), or in a computing system including a front-end component (e.g., a user computer having a graphical user interface or a web browser, through which the user can interact with the implementations of the systems and technologies described herein), or in a computing system including any combination of the back-end component, the middleware component, or the front-end component. The components of the system may be interconnected via digital data communication (e.g., a communication network) in any form or medium. Examples of the communication network include: a local area network (LAN), a block-chain-based service network (BSN), a wide area network (WAN) and Internet.

A computer system may include a client and a server. The client and the server are generally located far away from each other and usually interact with each other through a communication network. A relationship between the client and the server is generated by computer programs running on corresponding computers and having a client-server relationship between each other. The server can be a cloud server, also known as a cloud computing server or a cloud host, which is a host product in a cloud computing service system to solve shortcomings of difficult management and weak business scalability in traditional physical host and virtual private server (VPS) service.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A terminal device locating method, which is applied to a terminal device, and comprises:
   acquiring dialing information of a call of the terminal device; and
   if the call is determined to be an emergency call according to the dialing information, sending information related to a location of the terminal device through a non-network channel to an emergency locating server, so that the information related to the location of the terminal device is sent to a cloud server; wherein the information related to the location of the terminal device comprises at least one of an identification of a base station accessed by the terminal device and a Media Access Control (MAC) address of a wireless access network device accessed by the terminal device; wherein the information related to the location of the terminal device is used to determine at least one of location information of the base station and location information of the wireless access network device and to obtain location information of the terminal device based on the at least one of the location information of the base station and the location information of the wireless access network device by the cloud sever;
   wherein in a condition that the information related to the location of the terminal device comprises the identification of the base station accessed by the terminal device, before the sending information related to a location of the terminal device through a non-network channel to an emergency locating server, the method further comprises:
   acquiring an identification of a base station corresponding to time information closest to a current time from pre-stored list information of base stations accessed by the terminal device; and determining the identification of the base station acquired as the identification of the base station accessed by the terminal device;
   wherein in a condition that the information related to the location of the terminal device comprises the MAC address of the wireless access network device accessed by the terminal device, before the sending information related to a location of the terminal device through a non-network channel to an emergency locating server, the method further comprises:
   acquiring a MAC address of a wireless access network device with a strongest wireless signal from pre-stored list information of wireless access network devices that support an access of the terminal device; and determining the MAC address acquired as the MAC address of the wireless access network device accessed by the terminal device.

2. The method according to claim 1, wherein the non-network channel comprises a short message channel; the sending information related to a location of the terminal device through a non-network channel to an emergency locating server comprises:
   encoding, based on a short message protocol, the information related to the location of the terminal device to obtain a short message; and
   sending the short message to the emergency locating server through the short message channel.

3. The method according to claim 1, wherein the non-network channel comprises an audio channel; the sending information related to a location of the terminal device through a non-network channel to an emergency locating server comprises:
   converting, based on an audio protocol, the information related to the location of the terminal device into an audio message; and
   sending the audio message to the emergency locating server through the audio channel.

4. The method according to claim 1, wherein the dialing information comprises a call number; the acquiring dialing information of a call of the terminal device comprises:
   if a dialing instruction that triggers the call ends, acquiring a call number corresponding to the dialing instruction; or, if the dialing instruction that triggers the call ends and the terminal device is in a call state, acquiring the call number corresponding to the dialing instruction; and the method further comprises: determining that the call is an emergency call if the call number is an emergency call number.

5. The method according to claim 1, wherein the sending information related to a location of the terminal device through a non-network channel to an emergency locating server comprises:
receiving an encryption public key sent by the emergency locating server;
determining, according to the encryption public key and an identification of the terminal device, an encryption private key;
encrypting, according to the encryption private key, the information related to the location of the terminal device; and
sending encrypted information related to the location of the terminal device through the non-network channel to the emergency locating server.

6. The terminal device according to claim 5, wherein in a condition that the information related to the location of the terminal device comprises the identification of the base station accessed by the terminal device and the MAC address of the wireless access network device accessed by the terminal device, the location information of the base station comprises longitude and latitude information of the base station, the location information of the wireless access network device comprises longitude and latitude information of the wireless access network device; and longitude and latitude information included in an intersection of the longitude and latitude information of the base station and the longitude and latitude information of the wireless access network device is determined by the cloud server as the location information of the terminal device.

7. The method according to claim 1, wherein in a condition that the information related to the location of the terminal device comprises the identification of the base station accessed by the terminal device and the MAC address of the wireless access network device accessed by the terminal device, the location information of the base station comprises longitude and latitude information of the base station, the location information of the wireless access network device comprises longitude and latitude information of the wireless access network device; and longitude and latitude information included in an intersection of the longitude and latitude information of the base station and the longitude and latitude information of the wireless access network device is determined by the cloud server as the location information of the terminal device.

8. A terminal device, comprising:
at least one processor; and
a memory, in a communicational connection with the at least one processor; wherein, the memory stores instructions executable by the at least one processor, and the instructions are executed by the at least one processor, so that the at least one processor is configured to:
acquire dialing information of a call of the terminal device; and
if the call is determined to be an emergency call according to the dialing information, control an interface to send information related to a location of the terminal device through a non-network channel to an emergency locating server, so that the information related to the location of the terminal device is sent to a cloud server; wherein the information related to the location of the terminal device comprises at least one of an identification of a base station accessed by the terminal device and a Media Access Control (MAC) address of a wireless access network device accessed by the terminal device; wherein the information related to the location of the terminal device is used to determine at least one of location information of the base station and location information of the wireless access network device and to obtain location information of the terminal device based on the at least one of the location information of the base station and the location information of the wireless access network device by the cloud sever;
wherein in a condition that the information related to the location of the terminal device comprises the identification of the base station accessed by the terminal device, the at least one processor is further configured to:
acquire an identification of a base station corresponding to time information closest to a current time from pre-stored list information of base stations accessed by the terminal device;
and determine the identification of the base station acquired as the identification of the base station accessed by the terminal device; and
wherein in a condition that the information related to the location of the terminal device comprises the MAC address of the wireless access network device accessed by the terminal device, the at least one processor is further configured to:
acquire a MAC address of a wireless access network device with a strongest wireless signal from pre-stored list information of wireless access network devices that support an access of the terminal device; and determine the MAC address acquired as the MAC address of the wireless access network device accessed by the terminal device.

9. The terminal device according to claim 8, wherein the non-network channel comprises at least one of a short message channel and an audio channel;
in a condition that the non-network channel comprises the short message channel, the at least one processor is configured to:
encode, based on a short message protocol, the information related to the location of the terminal device to obtain a short message, and control the interface to send the short message to the emergency locating server through the short message channel; and
in a condition that the non-network channel comprises the audio channel, the at least one processor is configured to:
convert, based on an audio protocol, the information related to the location of the terminal device into an audio message, and control the interface to send the audio message to the emergency locating server through the audio channel.

10. The terminal device according to claim 8, wherein the dialing information comprises a call number; the at least one processor is configured to:
if a dialing instruction that triggers the call ends, acquire a call number corresponding to the dialing instruction; or, if the dialing instruction that triggers the call ends and the terminal device is in a call state, acquire the call number corresponding to the dialing instruction; and
determine that the call is an emergency call if the call number is an emergency call number.

11. The method according to claim 8, wherein the at least one processor is configured to receive an encryption public key sent by the emergency locating server, determine, according to the encryption public key and an identification of the terminal device, an encryption private key, encrypt, according to the encryption private key, the information related to the location of the terminal device, and send encrypted information related to the location of the terminal device through the non-network channel to the emergency locating server.

12. A terminal device locating system, comprising:
a terminal device according to claim 8; and
an emergency locating server comprising: at least one processor;
and a memory, in a communicational connection with the at least one processor; wherein, the memory stores instructions executable by the at least one processor, and the instructions are executed by the at least one processor, so that the at least one processor is configured to:
control an interface to receive information related to a location of a terminal device sent by the terminal device based on a non-network channel; wherein the information related to the location of the terminal device comprises at least one of an identification of a base station accessed by the terminal device and a Media Access Control (MAC) address of a wireless access network device accessed by the terminal device; the identification of the base station accessed by the terminal device is an identification of a base station corresponding to time information closest to a current time acquired from pre-stored list information of base stations accessed by the terminal device, and the MAC address of the wireless access network device accessed by the terminal device is a MAC address of a wireless access network device with a strongest wireless signal acquired from pre-stored list information of wireless access network devices that support an access of the terminal device; and
control an interface to send a locating request to a cloud server, wherein the locating request comprises the information related to the location of the terminal device, and the information related to the location of the terminal device is used to determine at least one of location information of the base station and location information of the wireless access network device and to obtain location information of the terminal device based on the at least one of the location information of the base station and the location information of the wireless access network device by the cloud sever;
wherein the at least one processor is configured to control the interface to receive the location information of the terminal device fed back by the cloud server; and
send the location information of the terminal device to a receiver platform corresponding to dialing information.

13. The terminal device locating system according to claim 12, further comprising:
a cloud server, configured to receive information related to a location of the terminal device sent by the emergency locating server, generate location information of the terminal device according to the information related to the location of the terminal device, and send the location information of the terminal device to the emergency locating server.

14. An emergency locating server, comprising:
at least one processor; and
a memory, in a communicational connection with the at least one processor; wherein,
the memory stores instructions executable by the at least one processor, and the instructions are executed by the at least one processor, so that the at least one processor is configured to:
control an interface to receive information related to a location of a terminal device sent by the terminal device based on a non-network channel; wherein the information related to the location of the terminal device comprises at least one of an identification of a base station accessed by the terminal device and a Media Access Control (MAC) address of a wireless access network device accessed by the terminal device; the identification of the base station accessed by the terminal device is an identification of a base station corresponding to time information closest to a current time acquired from pre-stored list information of base stations accessed by the terminal device, and the MAC address of the wireless access network device accessed by the terminal device is a MAC address of a wireless access network device with a strongest wireless signal acquired from pre-stored list information of wireless access network devices that support an access of the terminal device; and
control an interface to send a locating request to a cloud server, wherein the locating request comprises the information related to the location of the terminal device, and the information related to the location of the terminal device is used to determine at least one of location information of the base station and location information of the wireless access network device and to obtain location information of the terminal device based on the at least one of the location information of the base station and the location information of the wireless access network device by the cloud sever;
wherein the at least one processor is configured to control the interface to receive the location information of the terminal device fed back by the cloud server; and
send the location information of the terminal device to a receiver platform corresponding to dialing information.

15. The emergency locating server according to claim 14, wherein the non-network channel comprises a short message channel, and the information related to the location of the terminal device is a short message obtained by encoding the information related to the location of the terminal device based on a short message protocol.

16. The emergency locating server according to claim 14, wherein the non-network channel comprises an audio channel, and the information related to the location of the terminal device is an audio message obtained by converting the information related to the location of the terminal device based on an audio protocol.

17. The emergency locating server according to claim 14, the at least one processor is further configured to:
assign and send an encryption public key to the terminal device, wherein the encryption public key is used to determine an encryption private key with an identification of the terminal device;
determine the identification of the terminal device; and
decrypt, according to the encryption public key and the identification of the terminal device, the information related to the location of the terminal device.

18. The emergency locating server according to claim 14, wherein in a condition that the information related to the location of the terminal device comprises the identification of the base station accessed by the terminal device and the MAC address of the wireless access network device accessed by the terminal device, the location information of the base station comprises longitude and latitude information of the base station, the location information of the wireless access network device comprises longitude and latitude information of the wireless access network device; and longitude and latitude information included in an intersection of the longitude and latitude information of the base station and the longitude and latitude information of the wireless access network device is determined by the cloud server as the location information of the terminal device.

* * * * *